US006688871B1

(12) United States Patent
Lee et al.

(10) Patent No.: US 6,688,871 B1
(45) Date of Patent: Feb. 10, 2004

(54) APPARATUS FOR ENCAPSULATING A WORKPIECE WHICH IS TO BE MACHINED

(75) Inventors: Elmer C. Lee, Cambridge, MA (US); Sanja E. Sarma, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/386,693

(22) Filed: Aug. 31, 1999

(51) Int. Cl.[7] .......................... A23G 1/20; B23P 25/00; H01R 43/00
(52) U.S. Cl. ..................... 425/129.1; 29/527.6; 29/855
(58) Field of Search ............................ 29/527.6, 527.5, 29/530, 855; 425/117, 129.1

(56) References Cited

U.S. PATENT DOCUMENTS

| | | | |
|---|---|---|---|
| 3,546,748 A | | 12/1970 | Gardner |
| 3,768,945 A | * | 10/1973 | Wald .......................... 425/250 |
| 3,873,656 A | | 3/1975 | Garner |
| 3,972,663 A | * | 8/1976 | Taniguchi .................... 264/276 |
| 4,539,338 A | * | 9/1985 | Carlson et al. ............. 521/131 |
| 4,617,977 A | | 10/1986 | Mills |
| 5,376,317 A | * | 12/1994 | Maus et al. .................. 249/116 |
| 6,348,171 B1 | * | 2/2002 | Dewar et al. ............. 264/297.2 |

FOREIGN PATENT DOCUMENTS

| | | |
|---|---|---|
| EP | 0100574 | * 2/1984 |
| JP | 52/099483 | 8/1977 |

OTHER PUBLICATIONS

Sarma S.E. et al., "Reference Free Part Encapsulation: A New Universal Fixturing Concept", Journal of Manufacturing Systems, 1997, pp. 454–455, vol. 16, No. 6, US Society of Manufacturing Engineers, Dearborn, MI.

* cited by examiner

*Primary Examiner*—John C. Hong
(74) *Attorney, Agent, or Firm*—Wolf, Greenfield & Sacks, P.C.

(57) ABSTRACT

A method and apparatus are provided for encapsulating a workpiece in a material having a lower melting temperature than that of the material for the workpiece to form an encapsulated block of standardized size and shape which may be mounted in a standardized fixture to facilitate machining on the workpiece. The invention includes both specialized molds for use in encapsulating a workpiece for various types of machining and systems for clamping and injecting encapsulant into such molds under pressure. After machining on a given side, a block is re-inserted in the appropriate mold and re-encapsulated to standardize size and shape for a subsequent machining operation. The process of machining and re-encapsulation are repeated until all sides of the workpiece requiring machining have been machined, at which time the encapsulant is removed from the workpiece, normally by being heated and melted.

26 Claims, 11 Drawing Sheets

START:

TO FIG. 1C

FINISH:

3-D MILLING
  ACCESS: ALL 6 SIDES
  LOCATIONAL DATUM: MOLDED WALLS
  MOLDING TOLERANCES: TIGHT

2 1/2-D MILLING
  ACCESS: ONLY 5 SIDES
  LOCATIONAL DATUM: EXTERNAL
    EMBEDDED FEATURES
  MOLDING TOLERANCES: LOOSE

2-D MILLING
  ACCESS: ONLY 2 SIDES
  LOCATIONAL DATUM: EXTERNAL FRAME
  MOLDING TOLERANCES: VERY LOOSE

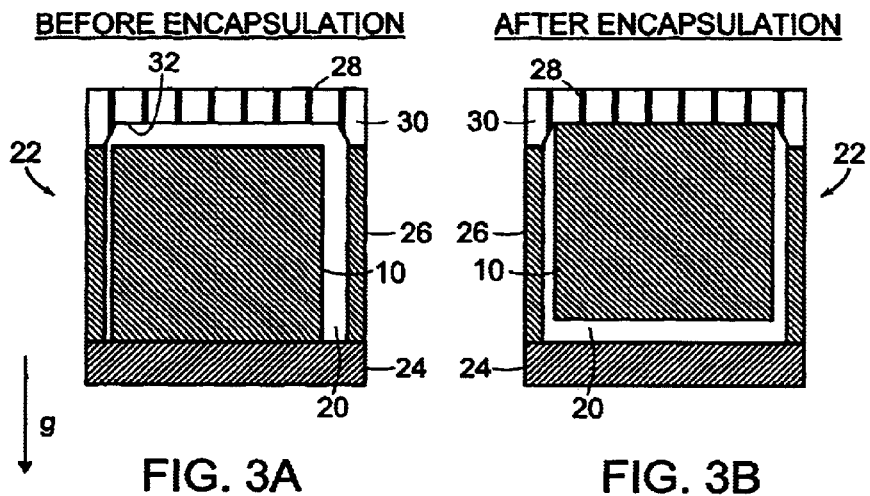
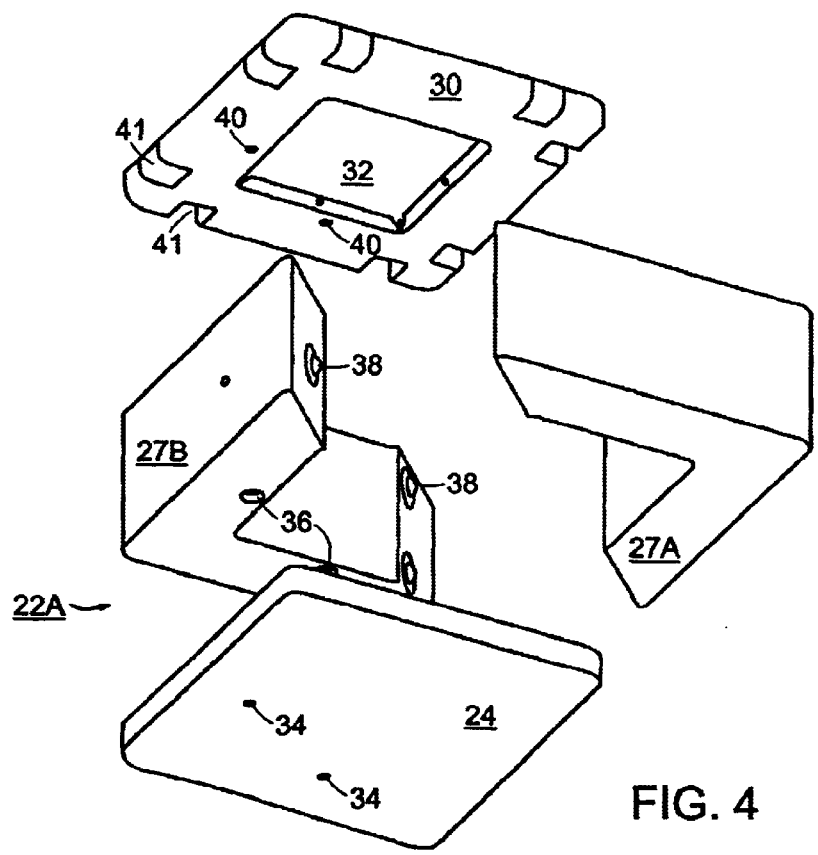

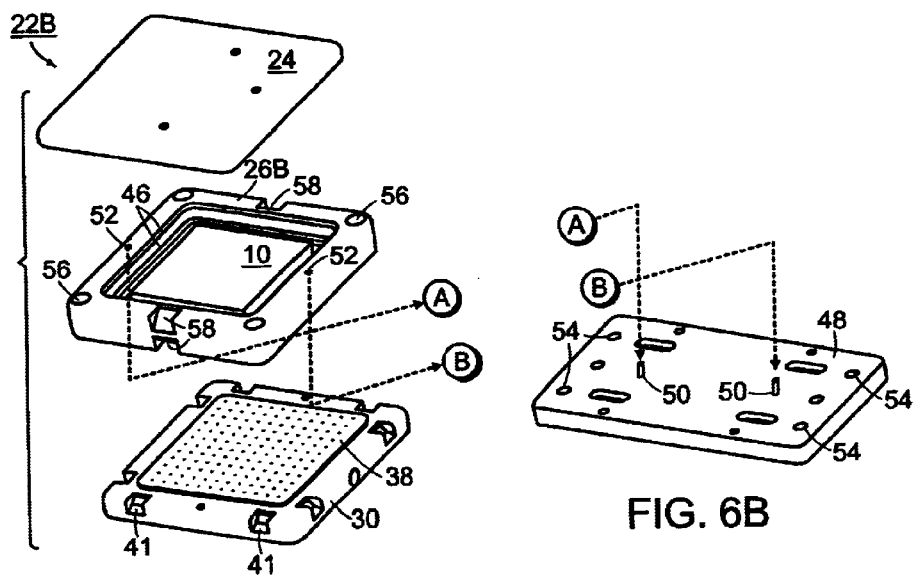
FIG. 6A
FIG. 6B
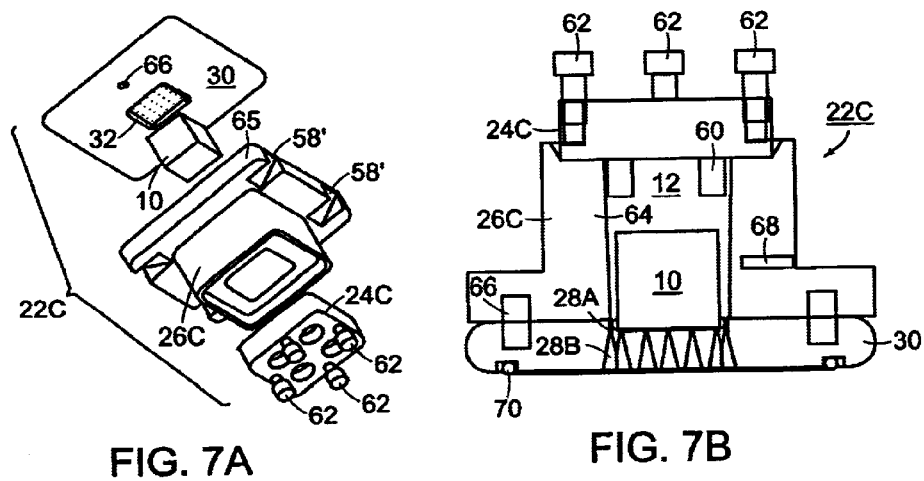
FIG. 7A
FIG. 7B

APPARATUS FOR ENCAPSULATING A WORKPIECE WHICH IS TO BE MACHINED

This invention was made with government support under Grant Number DMI-9702913 awarded by the National Science Foundation. The government has certain rights in the invention.

FIELD OF THE INVENTION

This invention relates to fixturing systems for workpieces which are to be machined, and more particularly to a method and apparatus for encapsulating a workpiece to be machined to form an encapsulation block of standardized size and shape so as to facilitate universal automated fixturing for workpieces of varying sizes and shapes.

BACKGROUND OF THE INVENTION

Machined parts can have complex shapes and can include thin and fragile areas. Some of the parts are also quite small. All of these factors complicate machining of the parts, and in particular the fixturing of the parts to facilitate such machining. Proper fixturing of a part for machining generally involves a number of factors including:

(a) Immobilization of the workpiece to allow aggressive machining of the part without spurious movement thereof. Without proper immobilization, machining must be done gently in order to avoid spurious movement of the part during machining, which movement can result in the destruction of the part. This significantly increases the time required to complete a machining operation.

(b) Unobstructed machining paths. Obstructions in the machining path significantly complicate the generation of tool paths and other computer aided manufacturing (CAM) data for the manufacturing process, thereby increasing both the time and expense for manufacturing the part.

(c) Locate the workpiece with absolute accuracy, particularly where parts are being manufactured with very fine tolerances. Even a small fixturing error in locating the part for a machining operation can result in parts being out of tolerance, and therefore worthless.

(d) Support the workpiece entirely. This is a particular problem where a significant portion of the original workpiece is removed during the machining operation, leaving fragile points on the part which must be thoroughly supported to avoid cracking, bending or breaking during subsequent machining operations. Fixturing to fully support a partially machined part so as to prevent damage thereto is frequently a difficult and expensive procedure. At times, it is not possible to properly fixture such parts and it is therefore necessary to manufacture them in two or more pieces which must subsequently be secured together.

Achieving the above objectives is further complicated by the fact that many, if not most, parts need to be machined on all six surfaces of for example an originally rectangular workpiece, or on at least five such surfaces. Since fixturing to achieve the above objectives generally requires gripping and holding the workpiece on several surfaces, typically four or five surfaces, it is normally necessary to refixture a part several times during the machining thereof. Therefore, multiple fixtures are generally required for the machining of a single part, as many as six different fixtures being required in the extreme case.

However, the design of custom fixtures and the fabrication of such fixtures for a particular part is an expensive procedure. While this procedure can be justified where the cost is spread out over the manufacture of many thousands of parts, the cost of developing and fabricating fixtures can be prohibitive for custom parts having a small run and is a particular problem where parts are being prototyped or are being made for use in a prototype product.

A need therefore exists for a universal fixturing system which eliminates the need for designing and fabricating custom fixtures for each part, and in particular designing multiple custom fixtures for each part to accommodate machining on various sides thereof, while still meeting all of the fixturing requirements indicated above. A proposal for such a universal fixturing system is provided in "A Methodology for Integrated CAD and CAM in Milling," a Ph.D. thesis of S.E. Sarma, University of California, Berkeley, 1995 and in "Reference Free Part Encapsulation: A New Universal Fixturing Concept," S. Sarma and P. Wright, Journal of Manufacturing Systems, Vol. 16/No. 1, 1997 ("the Sarma Papers"), which discuss the concept of encapsulating a workpiece to be machined in a material having a lower melting temperature than that of the material for the workpiece, the encapsulated block containing the encapsulated workpiece having a known, standardized size and shape which fits in a standardized fixture. Further, the concept involves re-encapsulating any portions of the encapsulated block, including the workpiece embedded therein, which are machined away during the machining of a given side or sides. This re-encapsulation accomplishes two functions. First, it assures that the block being fixtured is always of standardized size and shape, which can be mounted in a standardized fixture and can be precisely located therein. Second, it assures that all portions of the workpiece, regardless of how heavily machined and how fragile, are fully supported within the encapsulation material so that machining may be performed aggressively without risking cracking or breaking of the part, and without requiring complicated specialized fixturing.

However, while the concepts presented in the Sarma Papers represent an interesting approach to the universal fixturing problem, there are many problems involved in implementing such an encapsulation and re-encapsulation process, and the Sarma Papers do not describe a practical system for performing the encapsulation process which overcomes these various problems. Thus, while the encapsulation technique discussed in the Sarma Papers represents a promising approach to universal fixturing of parts or other objects to be machined, a need exists for a practical implementation of this approach.

SUMMARY OF THE INVENTION

In accordance with the above, this invention provides a mold for use in encapsulating a workpiece of a material having a density D1 in an encapsulant having a density D2 to form an encapsulated block. The mold includes a structure defining four sidewalls of an encapsulation cavity in the mold, a top plate and a bottom plate, which plates mate with the structure on opposite sides thereof to fully define and seal the cavity. One of the plates is a gate plate having a plurality of openings formed therethrough and spaced over the area of the gate plate adjacent the cavity, with encapsulant being applied to the cavity through the gate plate openings. The openings may be substantially evenly spaced over the area of the gate plate; and are, in any event, sufficient in number and are positioned so that at least one opening overlies the smallest feature to be machined in the workpiece. The diameter at least at the cavity side of each of the gate plate openings is preferably no more than approximately 0.03 inches. Each of the openings preferably has a selected small diameter extending for a short distance from the cavity side of the opening and then flares to increasing diameters for its remaining length. The gate plate is preferably formed of a material having good high temperature characteristics but poor thermal conductivity, such material for example being a ceramic.

For one embodiment of the invention where D2 is greater than D1, the mold is oriented with the top and bottom plates being substantially horizontal, and an orienting structure is formed on the cavity side of the top plate, the workpiece floating up into orienting contact with such orienting structure when encapsulant is applied to the cavity. The orienting structure may for example be a depression formed in the top plate, which depression preferably has chaffered walls. The workpiece is preferably oriented in the cavity so that the thickness of encapsulant on the workpiece is substantially uniform. For preferred embodiments, the top plate is the gate plate. A recess having rounded corners may be formed in the bottom plate.

The cavity preferably has a substantially rectangular shape, with sidewalls that are substantially perpendicular to the top plate, to the bottom plate, and to each other. The structure portion of the mold may be divided into two L-shaped pieces, the parting line for such pieces bisecting the structure diagonally at two corners thereof. Each of the L-shaped pieces may (i) have a corner extending from top to bottom thereof; and (ii) be hinged at substantially the bottom of such corner along a line substantially parallel to the parting line. Each of the L-shaped pieces is normally biased so as to pivot about its hinge upward from the bottom plate and away from each other, the L-shaped pieces being moved down into sealing engagement with the bottom plate and with each other along the parting line when the top plate is pressed down toward the bottom plate against the L-shaped pieces. For these embodiments, the cavity may have a substantially cubic shape, so that an encapsulated block is reinsertable into the cavity for re-encapsulation in any orientation thereof that has sides of the block parallel to cavity walls.

For a second embodiment of the invention, the top plate is the gate plate, and the bottom plate has a plurality of projections extending therefrom into the cavity, the projections being encapsulated in the encapsulant with the workpiece to secure the bottom plate to the encapsulated block. For this embodiment, the sidewalls of the cavity, as defined by the structure, are preferably at a draft angle to facilitate removal of the block from the mold. The projections may include at least one feature, for example a screw thread, facilitating entrapment of the projection in the encapsulant.

For still another embodiment of the invention, the mold structure retains an encapsulated block therein after encapsulation, the structure including features facilitating mounting thereof for fixturing and/or re-encapsulation of the workpiece. For this embodiment, the structure preferably includes at least one feature facilitating retainment of the block therein.

The invention also includes a system for encapsulating and re-encapsulating a workpiece to be machined in an encapsulant to form an encapsulated block, the system including a source of melted encapsulant, a mold having the structure, top plate and bottom plate defining a cavity described above, a clamping mechanism which holds the structure and plate of the mold together under a selected pressure, and an injector mechanism which moves melted encapsulant under pressure from a source thereof through the gate plate and into the cavity. The clamping mechanism may include a reservoir for melted encapsulant, the injector mechanism applying pressure to melted encapsulant in the reservoir to force encapsulant therefrom through the openings in the gate plate to the cavity.

The source may include a storage tank having a heater for melting encapsulant in the tank and an outlet port connected by heated plumbing to the injector mechanism. The injector mechanism preferably includes a first check valve between the source and the injector mechanism which permits encapsulant flow only in the direction from the source to the injector mechanism, and for preferred embodiments also includes a second check valve between the injector and clamping mechanism which permits encapsulant flow only in a direction from the injector mechanism to the clamping mechanism. A bypass is preferably provided around the second check valve for pressure equalization in the system, and particularly in the clamping mechanism, once the injector mechanism is deactivated. The injector mechanism should also include a piston and at least one heater for maintaining the temperature in the injector mechanism above a melting temperature for the encapsulant. At least one high-temperature elastomer O-ring may be provided for sealing the piston.

The clamping mechanism may include a top support to which the mold top plate is mounted and a bottom support to which the mold bottom plate is mounted, the mold structure being mounted between the top and bottom plates, and a primary clamping stage mounted to move at least one of the supports towards the other when activated to seal the mold under pressure. For a preferred embodiment, the primary clamping stage includes a pneumatic piston and a mechanical enhancement for substantially increasing the force applied by such piston to the mold. The clamping mechanism may be adapted to clamp molds of different types and sizes and may include a secondary clamping stage for adjusting the position of at least one of the supports when the primary clamping stage is in its deactivated position to compensate for the type and size of mold being used. At least one locking block may be provided which is mounted between the bottom support and a housing member of the clamping mechanism for at least some of the mold types/sizes, the height of the block between the support and the housing member varying with the type/size of the mold. Each of the locking blocks may include a fine adjustment mechanism operable to compensate for small variations in mold size.

The clamping mechanism may also be designed to thermally isolate the mold from the clamping mechanism, the gate plate, for example, being of a material having poor thermal conductivity, and a cooling plate and insulation being provided between the bottom plate of the mold and a bottom support to both isolate and more quickly cool the mold once encapsulant has been injected.

A component may also be provided which is positioned adjacent the gate plate and through which encapsulant flows before reaching the gate plate, which component permits flow of encapsulant therethrough when the encapsulant is under pressure from the injector mechanism and which breaks the flow of encapsulant when such pressure is removed. For a preferred embodiment, the component is an elastomer diaphragm having a split form therein. A valve may also be provided ahead of the gate plate to selectively cut off encapsulant flow to the mold cavity even when pressure is being applied by the injector mechanism.

Quick release elements may also be provided for releasably securing at least one of the mold elements (i.e., the structure, top plate and bottom plate) in the clamping mechanism, the quick release elements facilitating removal of the block from the mold and the changing of molds. For a preferred embodiment, the top plate is the gate plate, and the quick release elements include a first set of such elements releasably securing the top plate to a top structure of the clamping mechanism, and may include a second set of elements for releasably securing the mold structure to the bottom plate, the bottom plate being mounted to a bottom structure of the clamping mechanism. Each quick release mechanism may include a piston-driven wedge shaft co-acting with a corresponding wedge-shaped recess formed in the mold structure/plate being clamped. For an alternative embodiment, the above is reversed, the structure being secured by elements to the top structure, also securing the gate plate thereto, and the bottom plate being secured to the bottom structure. The clamping mechanism and/or the injector mechanism are preferably pneumatically driven, as are the quick release elements.

The invention also includes a method for encapsulating and re-encapsulating a workpiece to be machined in an encapsulant, which method includes the steps of: providing a mold having an encapsulation cavity, the side walls of which are defined by a structure, and including a top plate and a bottom plate, which plates mate with the structure on opposite sides thereof to fully define and to seal the cavity, one of the plates being a gate plate having a plurality of openings through which encapsulant is applied to the cavity; placing the workpiece to be encapsulated in the cavity; clamping the structure and plates of the mold together under a selected pressure; and injecting melted encapsulant under pressure from a source thereof through the gate plate to the cavity to form an encapsulated block. The method may also include the steps of removing the encapsulated block from the mold; machining at least one surface of the block; re-inserting the block in the encapsulation cavity; and repeating the clamping and injecting steps to refill machined features, thus restoring the fully encapsulated block. The sequence of steps indicated above may be repeated a number of times sufficient for all sides of the workpiece which are to be machined to be machined. When machining on the workpiece is completed, the step of melting and removing encapsulant from the workpiece is performed. The bottom plate may have projections formed thereon which projections are embedded in the block during the injection step. For this embodiment, the removing step includes separating the bottom plate from the mold with the block affixed thereto, the block/workpiece being machined and being reinserted into the mold for re-encapsulation while affixed to the bottom plate. Alternatively, the structure of the mold may have features facilitating attachment of the structure to the block during the injection step, the structure remaining with the block during the removal, machining and reinsertion steps and being utilized to facilitate each of these steps.

The foregoing and other objects, features and advantages of the invention will be apparent from the following more particular description of preferred embodiments of the invention as illustrated in the accompanying drawings.

IN THE DRAWINGS

FIGS. 3A and 3B are cutaway side views of a workpiece within a mold cavity before and after injection of encapsulant for an illustrative embodiment;

FIG. 4 is an exploded perspective view of a mold suitable for use in a 3D embodiment of the invention;

FIG. 6A is an exploded perspective view of a 2D mold suitable for use in practicing the teachings of this invention;

FIG. 6B is a perspective view of a machine tool fixture to which the center structure of the mold of FIG. 6A may be mounted;

FIG. 7A is an exploded perspective view of a mold suitable for use in a 2½D embodiment of the invention;

FIG. 7B is a cutaway side view of the mold shown in FIG. 7A with encapsulant and a workpiece therein;

Figure 8:
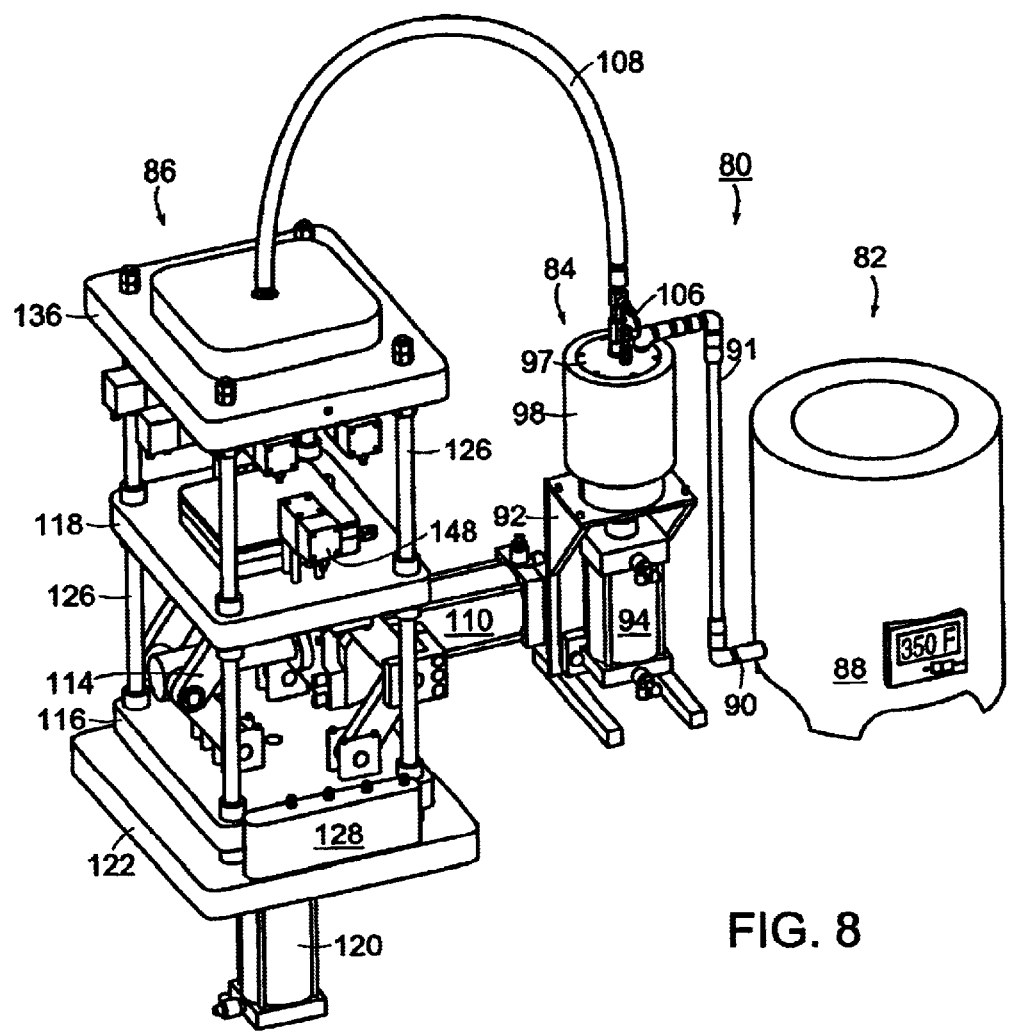
FIG. 8 is a perspective view of an encapsulation system suitable for use in practicing the teachings of this invention.
Figure 13:
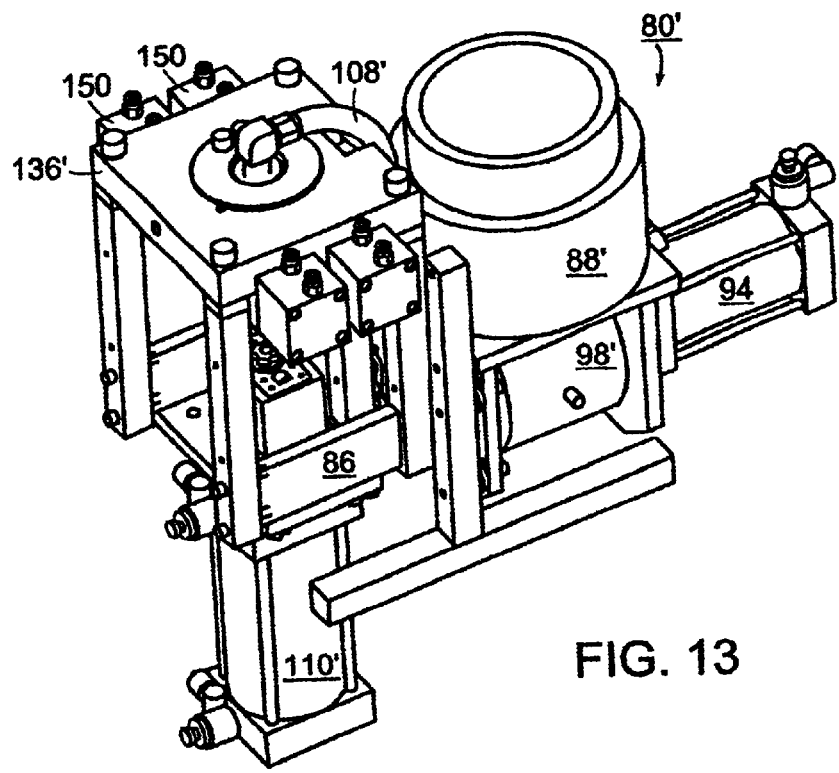
Figure 14:
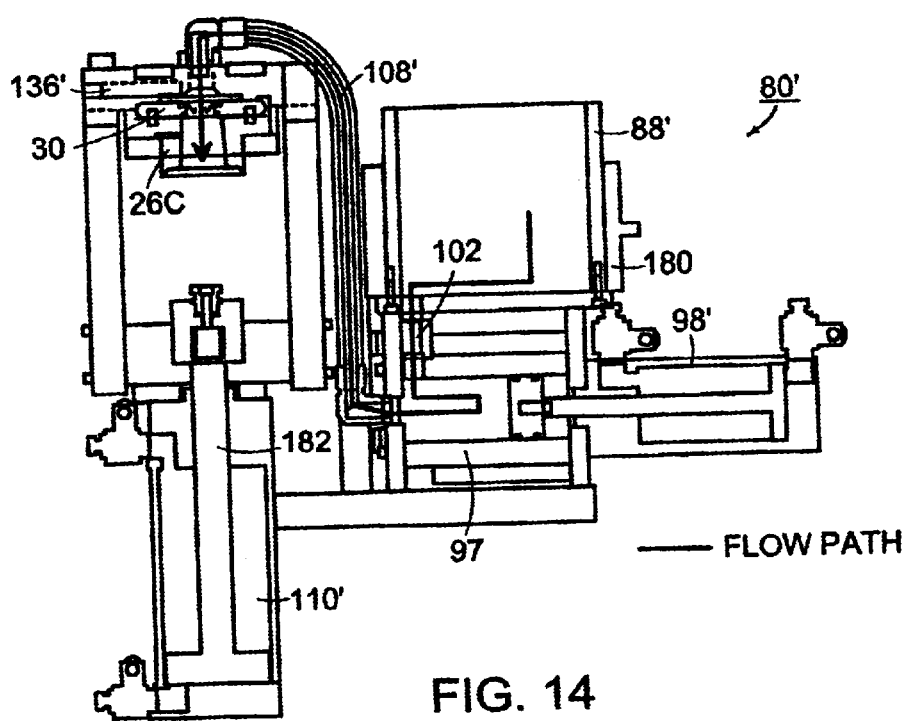

FIG. 13 is a perspective view of an alternative encapsulation system, which system is smaller and lighter than that shown in FIG. 8, and therefore more portable; and FIG. 14 is a cutaway side view of the system shown in FIG. 13, illustrating the encapsulant flow pattern for this system; and In the various Figures, the same reference numerals are used for common elements, related reference numerals being used where the differences in common elements so warrant.

DETAILED DESCRIPTION

Figure 1A:
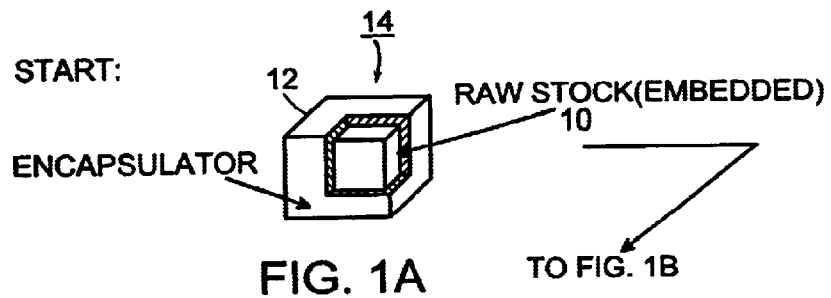
FIG. 1A is a cutaway, perspective representation of a workpiece embedded in an encapsulant for form an encapsulated block.
Figure 1B:
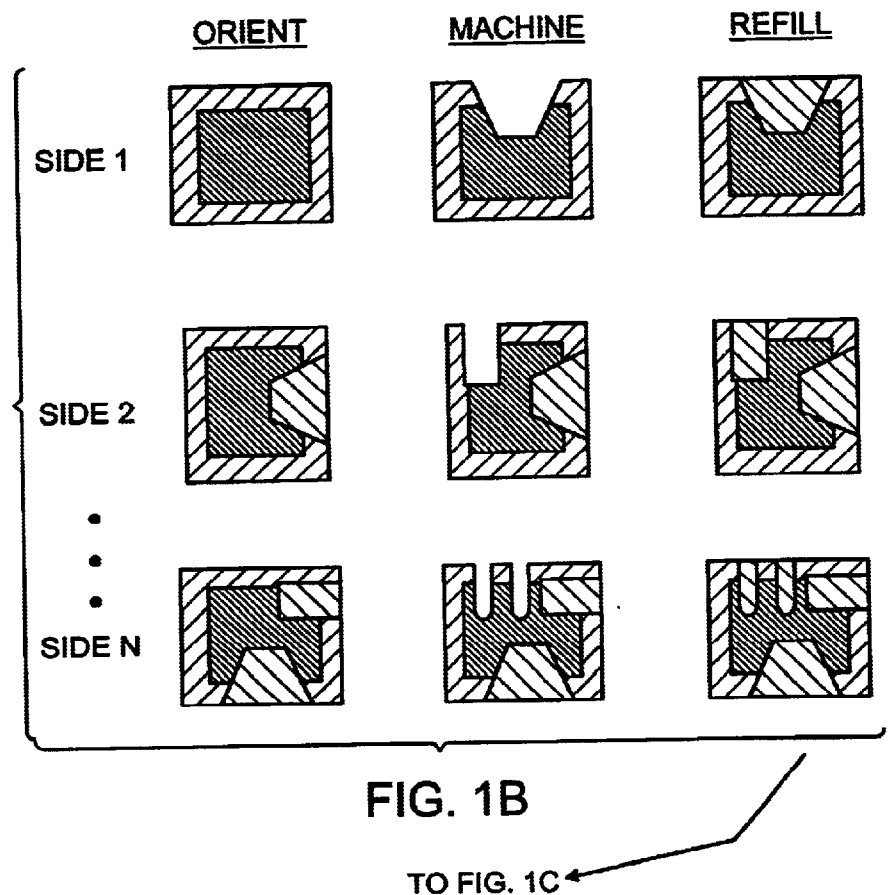
FIG. 1B is a graphic representation of the process of forming a part from an encapsulated block including the refilling of the body after the machining of each side thereof.
Figure 1C:
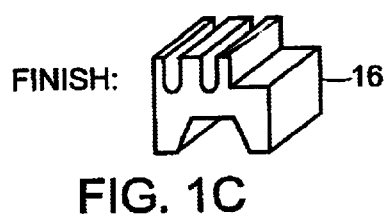
FIG. 1C is a perspective representation of the part formed employing the steps of FIG. 1B.

The basic concept for performing universal fixturing as taught in the before-mentioned Sarma Papers is illustrated in FIGS. 1A–1C. Referring to FIG. 1, the basic concept is to encapsulate the raw stock or workpiece 10 which is to be machined in an encapsulant material 12 having a melting point which is lower than that of the material for workpiece 10 to form an encapsulated block 14. Encapsulated block 14 has a uniform shape and size and has dimensions which are precise enough so that the walls of block 14 may be utilized for indexing the workpiece in a machine tool and in the fixturing thereof, eliminating the need for external referencing elements for indexing purposes. The block 14 thus permits a single universal fixture to be utilized for parts of almost any imaginable shape that can be formed from a workpiece of the size of workpiece 10. If a larger part is required, then a larger block 14 will be required. However, machining of huge numbers of parts can be done with only a few different standardize block/fixture sizes.

Once an encapsulated block 14 has been formed, it may be mounted in a fixture and machined, as shown for example in the first two drawings on line 1 of FIG. 1B. The block is then reinserted in a mold and the machined-out portion refilled with encapsulant as shown in the last drawing on line 1. The re-encapsulated block is then placed in a fixture with a different side exposed, and this side is machined as shown in the first two drawings on line 2 of FIG. 1B. The block is then reinserted in a mold and the machined features thereof re-encapsulated as shown for the last figure on line 2. This process may be repeated as many times as is required to machine as many of the six sides of workpiece 10 as require machining, the last line in FIG. 1B showing the process for a third side of the workpiece. When the machining on workpiece 10 is completed, encapsulated block 14 is heated to a temperature sufficient to melt encapsulating material 12, but not sufficient to destroy or degrade (i.e., soften or melt) the material of workpiece 10. This causes the encapsulant to flow away from the machined part, leaving the final part 16 shown in FIG. 1C.

While only three sides are machined for the part 16, more typically there would be some machining on all sides of a given part. When this is done, then the initial orientation/location of the workpiece in embedded body 14 is not critical, so long as there are no features on the workpiece 10 when first embedded. This simplifies the encapsulation process, and in particular means that no external referencing elements are required to position workpiece 10 when performing the encapsulation, the precise walls of block 14 itself being sufficient for referencing purposes. Another significant advantage of the procedure shown in FIG. 1 is that, since all portions of the workpiece 10 being worked on are always fully embedded and supported by the encapsulant, even when substantial portions of the workpiece have been machined away to leave relatively fragile features or points on the workpiece, the workpiece is still fully supported so that the manufacturing process is not burdened by the need to gently machine to avoid breaking, bending or cracking the part being worked on, significantly simplifying both the design and the machining process and speeding up the performance of these processes. Further, even when there has been substantial machining on the part 16, the same universal fixture can still be utilized for performing further machining thereon.

Thus, the technique shown in FIG. 1 has significant advantages when used as part of a manufacturing design and fabrication process. However, there are many issues, some of which are discussed in the Sarma Papers, in taking the above from a concept to an implementable process. First, since indexing is done on the walls of the encapsulated block, the quality of these walls becomes important. However, many encapsulation materials suitable for use in forming an encapsulated block 14 will have air trapped therein with normal encapsulation processes which adversely affect the quality of the walls of the block and can also interfere with good adhesion between workpiece 10 and the encapsulant 12. Shrinkage of an encapsulation material when cooled is another potential problem which can prevent the walls of the block from having the straight sides at right angles to each other required for indexing the block and the workpiece contained therein in a fixture.

Other requirements include inserting the encapsulant over a large enough area so that, when re-encapsulation is performed, encapsulant can flow to areas requiring re-encapsulation without being blocked by areas already encapsulated. For example, in FIG. 1B, when re-encapsulating the structure shown in the middle figure of the bottom row, if encapsulant were inserted only in the middle of the mold, encapsulant might not reach the machined-out portion on the left side of the block, resulting in the block not being fully re-encapsulated.

However, if larger openings are provided through which the encapsulant is injected so as to assure that all features cut in the block are re-encapsulated, when the encapsulant flowing through these openings freezes, it may be difficult to remove the block from the mold, the large nubs or sprues formed at the openings being difficult to break, significantly complicating removal of the block from the mold.

Further, since as can be seen from FIG. 1, multiple encapsulations may be required for each part being fabricated, it is desirable that the process of encapsulation and re-encapsulation be performed as quickly as possible, so that this step does not result in delays in the manufacturing process and so that a single encapsulation/re-encapsulation machine may service as many processing machines as possible, thereby minimizing the incremental cost of the encapsulation/re-encapsulation process. However, this speed of operation must be accomplished without compromising the high surface quality standards previously discussed which are normally required for the sides of the block.

Figure 2A:
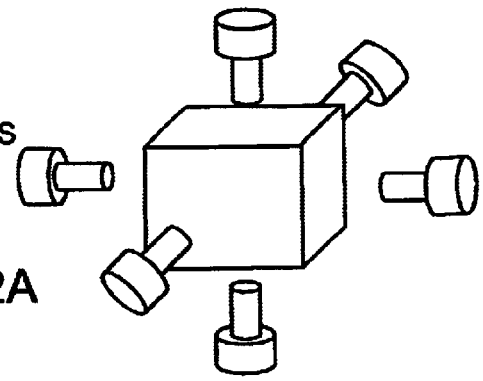
FIGS. 2A–2C are graphic perspective representations of a 3D milling process, a 2½D milling process and a 2D milling process, respectively.
Figure 2B:
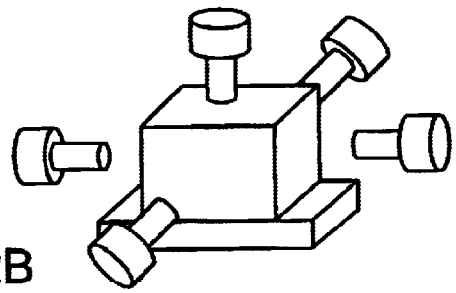
Figure 2C:
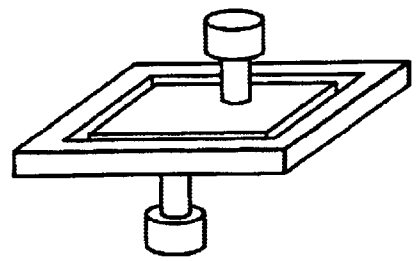

Further, as was indicated earlier, several standardized block sizes are generally required to accommodate all parts which may need to be produced at a given facility, and, as will be discussed later, different machining techniques may require different types of molds. It would be preferable if a single encapsulation/re-encapsulation system could be utilized to handle all of the various block sizes and/or mold types required at a given facility rather than requiring a dedicated encapsulation/re-encapsulation machines for each block size/mold type. More specifically, it is desirable that substantially the same equipment to be used for encapsulation and re-encapsulation for 3D processes where milling or machining will be performed on all six sides of the workpiece 10 as shown in FIG. 2A, 2½D machining, where only five sides of the workpiece need to be machined (FIG. 2B) and 2-D milling where only two sides of the workpiece are machined (FIG. 2C). While the molds used for these various different types of machining will, as will be discussed later, be different, the system used for encapsulation and re-encapsulation can be substantially the same, thereby permitting maximum utilization thereof. Other desirable features include a capability for controlling the orientation of the workpiece within the block within at least certain tolerances, that the mold be designed so as to facilitate removal of the block from the mold, preventing the mold from becoming wedged therein, at least for molds used for 3D applications and/or that the block be securely mounted to a portion of the mold for other embodiments. Other considerations, including safety, are also important. Therefore, there is a need to take the encapsulation and re-encapsulation concepts discussed above of the Sarma Papers and to develop methods and apparatus for the effective implementation thereof, which methods and apparatus overcome the various problems indicated above, and others, and which meet the design requirements for a practical method and apparatus to encapsulate and re-encapsulate a workpiece so as to facilitate universal fixturing.

It has been found that one way to solve many of the problems indicated above is to apply encapsulant to the mold under pressure. In particular, it has been found that if encapsulant is applied to a mold under relatively low pressure, in a range of approximately 250-psi, far superior dimensional accuracy is achieved for the block 14. However, a relatively large shot size is also required in order to fill the mold, which shot size will vary with the size of both the mold and of the workpiece 10 being utilized, being approximately 55 in$^3$ for an empty 4"×4"×4" mold. More specifically, the effects of shrinkage are greatly reduced when pressure is used to constantly pack the mold during the solidification cycle. The added pressure also results in fewer, if any, gaps and voids in the interface line between the workpiece and the encapsulant resulting in significantly better gripping of the encapsulated workpiece and filling of the mold. Tests have indicated that pressure injected encapsulation may result in the encapsulation being able to hold the workpiece approximately four times better than when pressure is not utilized. These benefits derive from the pressure driving air bubbles from the stock surface and forcing the liquid encapsulant to conform better to the workpiece surface. Air bubbles are also eliminated within the encapsulant itself, strengthening the encapsulant so as to prevent chipping, cracking or breaking of the block during machining and permit more pressure to be applied to the block during these operations; and air bubbles are also removed at the mold encapsulant interface, providing higher quality surfaces. Pressure also allows the molding of sharper corners and re-encapsulation of smaller part features.

Another benefit of pressure is that it allows the molds to be filled more quickly, and thus permits an encapsulant to be inserted into a colder mold with less worry of premature freezing. Finally, pressure permits the encapsulation material to travel into the mold through smaller gates or openings, resulting in smaller and more easily removable nubs or sprues when the encapsulant freezes, which nubs are more easily broken off to facilitate removal of the block from the mold.

However, applying encapsulant to a mold under pressure also presents a number of challenges. For example, in addition to developing a technique for applying an encapsulant to a mold under substantially uniform pressure of the desired amount, pressure also requires that the mold be clamped and sealed so as to prevent encapsulant leaking therefrom during the pressurized encapsulation process. Techniques for permitting molds of various types and sizes to be effectively clamped in a single clamping mechanism do not currently exist.

Since, as shown in FIG. 2, there are at least three different machining techniques, which can be used on a block 14, it has been found advantageous to use a different mold to form blocks used in practicing each of these techniques. For each of these techniques, as will be discussed in greater detail later, the mold has three major sections, a top plate, a bottom plate, and a structure between the plates which defines the sidewalls of the mold cavity. For preferred embodiments of the invention the top plate is a gate plate through which encapsulant is applied to the mold cavity. However, while applying encapsulant to the mold from the top is currently considered preferable for a number of reasons (including a shorter flow path for the encapsulant which facilitates buoyancy to be discussed later and more uniform cooling/hardening of the encapsulant), this is not a limitation on the invention, and, in an appropriate application, one or more of the bottom plate and/or one or more side walls may be the gate plate(s).

FIG. 3A illustrates one potential problem that can exist with any of the molds, namely that the stock 14 is not initially well centered in the cavity 20 of mold 22. While it is desirable for one side of stock 10 not to initially be encapsulated, this side being the side on which machining is initially to be performed, since the density of the encapsulation material is generally greater than that of the material for stock 10, it is unlikely, once encapsulation material is applied to the mold, that stock 10 will remain in contact with bottom plate 24 of the mold and the degree of this separation is not easily predictable. Further, while it is not essential that the spacing of stock 10 from the walls of center structure 26 be uniform on all sides, it is preferable in properly controlling the machining operation that the spacing between the stock and the walls of section 26 be substantially uniform and substantially predictable.

FIG. 3B shows one way in which this may be accomplished. In this figure, encapsulant is applied to the mold in a manner to be described later through a plurality of gates or openings 28 in a top or gate plate 30 of the mold. As the encapsulant flows into the mold, with the mold positioned upright or substantially vertical, workpiece or stock 10 floats up on the higher density encapsulant and into chaffered recess 32 formed in top plate 30, the chaffered recess guiding the stock as it rises into a centered position in mold cavity 20. FIG. 3B shows the position of stock 10 in cavity 20 when the cavity is full of encapsulant, the stock butting against top plate 30 and being substantially evenly spaced from the other walls of the cavity, including the bottom wall. Thus, workpiece or stock 10 has a substantially even encapsulation layer on five sides thereof, and has one side which is not initially encapsulated, which side is the side which is initially machined. However, encapsulating on only five sides is not a limitation on the invention and the mold may be modified to permit encapsulation on all six sides as shown in FIG. 1A. In particular, once the initial side has been machined, it is desirable to be able to index on this side when other sides are being machined. Therefore, during re-encapsulation on this side, gate plate 30 may be replaced with a gate plate having a recess of suitable depth so that, when encapsulant is applied to block 10 in the mold during re-encapsulation, in addition to filling machined out areas on this side, a layer of encapsulant is formed over this side of block 14 which layer has a thickness roughly equal to the thickness of the encapsulation layers on the other five sides. This added thickness of encapsulant facilitates both the indexing and support functions of encapsulation. It should also be noted that during re-encapsulation, since the portion of the block already formed is not melted, the workpiece remains embedded in the block rather than floating to the top, this being necessary both to maintain the desired registration of workpiece 10 in the block and to permit an encapsulation layer to be formed over the previously exposed side. Normally, a block as shown in FIG. 3B would not be a perfect cube, being smaller in a vertical dimension of FIG. 3B than in the other two dimensions by an amount roughly equal to the thickness of encapsulant on each side of the workpiece, so that when this side is fully encapsulated during a re-encapsulation operation as described above, block 14 becomes a perfect cube which can be inserted into the mold with the modified gate plate in any orientation for re-encapsulation.

From FIG. 3 it is also seen that the openings 28 in gate plate 30 are substantially evenly distributed over the gate plate in the portion thereof overlying the cavity. For reasons to be discussed in greater detail later, these openings are preferably relatively small, particularly in the area thereof adjacent the cavity and, while uniform spacing is not required for the gate openings (or gates), they should be spaced by a distant which is no greater than the spacing of the smallest features which might be machined into stock 10, so that at least one opening 28 is over, or at least substantially over, each feature during any re-encapsulation. Since the construction shown in FIG. 3 permits centering of stock 10 without requiring features protruding from the mold walls in order to hold stock 10 in place during encapsulation, the removal of encapsulated block 14 from the mold is facilitated and undesirable, divots, holes or the like in the block are avoided. However, the above assumes that there are no initial features in stock 10 requiring specific alignment of the stock in block 14, and assumption which is made because if this was not the case, some features would be require in mold cavity 20 in order to assure proper orientation of the stock therein, such features causing a number of problems including problems in the uniformity of block 14 and in the removal thereof from the mold.

FIG. 4 illustrates a mold 22A suitable for use to encapsulate a workpiece for 3D milling (FIG. 2A). This mold has a bottom plate 24, a top gate plate 30 with a chaffered recess 32 formed therein and a center structure 26 which is divided into two L-shaped pieces 27A, 27B. Two pins 34 are provided in bottom plate 24, which mate with corresponding holes in part 27B to align part 27B with the bottom plate. Similarly, to assure that the two L-shaped pieces 27A, 27B mate to each other repeatedly, kinematic coupling balls 38 are provided on part 27B which mate with corresponding grooves 29 (FIG. 5B) manufactured into the mating surface of part 27A. In order to maintain a high tolerance in the mold cavity, the two L-shaped pieces are mated together, machined as one piece, using for example wire EDM to create the mold cavity. The part line separating parts 27A and 27B should exactly bisect the two diagonally to ensure that encapsulation does not get caught inside the cavity once it has solidified. While not shown in FIG. 4, gate plate 32 also has gates or openings 30 formed therein, and also has a plurality of pins 40 (two pins in FIG. 4) which mate with corresponding holes 31 in part 27B to assure proper mating of these components. All mating surfaces of mold 22A should be ground flat to assure that they will be able to seal, it being preferred that sealing rings or the like not be required. Top gate plate 30 also has eight wedge-shaped grooves 41 formed therein which are spaced on the inside surface thereof. The function of these wedge grooves 41 will be described later. High tolerances are required for all cavity surfaces for the mold 22A since, for 3D machining, all indexing is done off the walls of the block 14 formed in this cavity. This high tolerance will not be required for some of the subsequent molds where indexing is not primarily dependent on block walls.

Figure 5A:
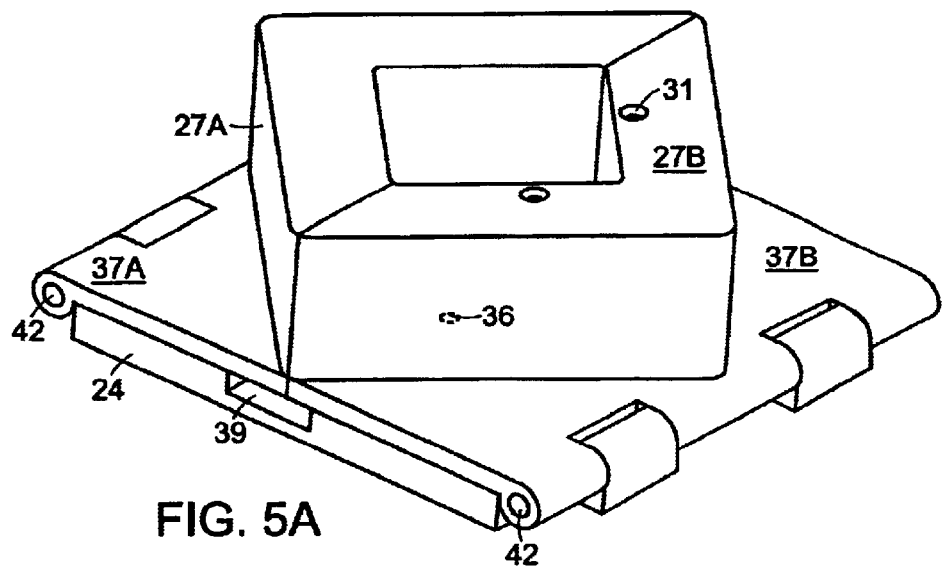
FIGS. 5A–5B are perspective side views illustrating a mold of the type shown in FIG. 4 for a preferred embodiment in a closed and open state respectively.
Figure 5B:
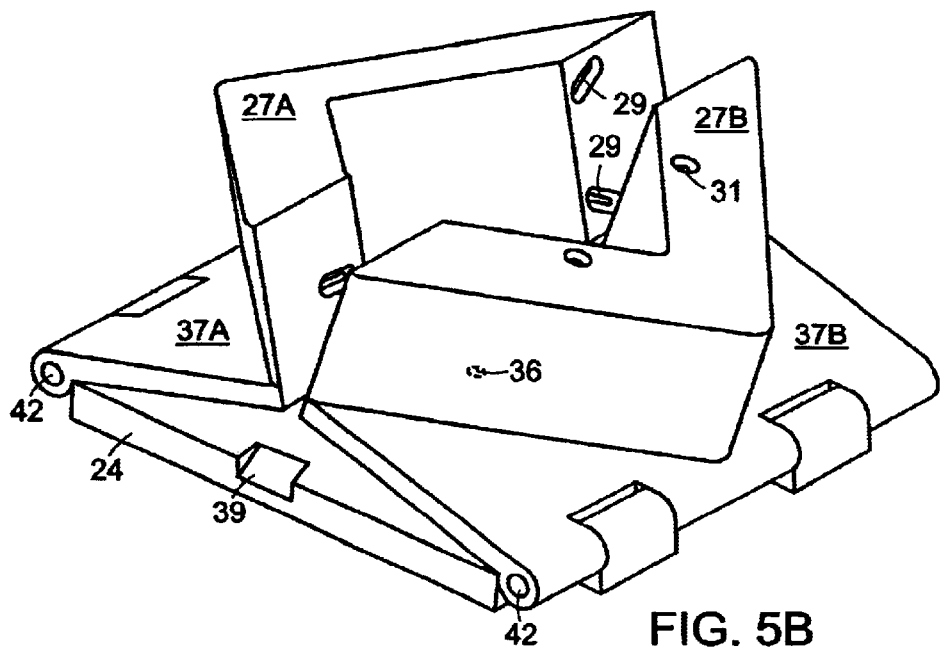

Because the center structure 26 of the 3D mold shown in FIG. 4 is composed of two pieces, a side clamping action is needed to assure proper sealing along the diagonal clamping surface, this side clamping being in addition to the vertical clamping normally required between center structure 26 and the top and bottom plates on either side thereof. FIGS. 5A, 5B illustrate preferred a mechanism that permits the vertical clamping force normally required to also transmit the needed side clamping force. Referring to these figures, pieces 27A, 27B have flanges 37A, 37B extending therefrom, which flanges are hinged along a line parallel to the diagonal parting line at a point 42 near the lower corner of each L-shaped piece to bottom plate 24. The L-shaped pieces are preferably spring biased (for example by compression springs between the pieces 27A, 27B and plate 24, or otherwise biased in a direction up from bottom plate 24 and away from each other as shown in FIG. 5B so that the mold is normally in the position shown in this figure. When either a workpiece 10 to be encapsulated or an encapsulated block 14 to be re-encapsulated is positioned in the mold, and plates 24 and 30 are moved toward each other parts 27A and 27B are pivoted down and toward each other as shown in FIG. 5B. When plates 24 and 30 reach their final position, pressing plates 24 and 30 against parts 27A, 27B with a selected pressure, parts 27A and 27B are also pressed against each other with sufficient pressure to seal the mold. Wedge grooves 39 are shown in bottom plate 24 for this mold embodiment for reasons to be discussed later.

FIG. 6A shows a mold 22B for an alternative embodiment, which embodiment is suitable for use for 2D milling as shown in FIG. 2C. Since for this embodiment, machining need be done on only two surfaces of workpiece 10, the procedure for encapsulating and re-encapsulating the workpiece may be substantially simplified. In particular, center structure 26B can be in a single piece or frame which remains with block 14 during encapsulation, machining and re-encapsulation. Center section 26B of the mold has one or more ridges or other suitable features 46 formed therein which are encapsulated in block 14 during the encapsulation operation and which, in conjunction with a slight expansion of the encapsulant as it solidifies, result in block 14 being securely mounted in center section 26B after encapsulation. For machining of block 14 and of the workpiece encapsulated therein, center section 26B is removed from the mold after encapsulation and is mounted on a machine tool mounting fixture 48, which fixture is either the fixture for the machine tool being utilized, or easily attaches to such fixture. Two precision pins 50 are provided on fixture 48 which co-act with dowel holes 52 on center section 26B to precisely position and constrain motion of section 26B and of the block 14/workpiece 10 mounted therein in two planes, for example, the x and y planes. Constraint in the third or z plane is obtained by bolting center section or frame 26B to fixture 48 using bolt-holes 54 in the plate and 56 on center section. The two sides of center section 26B are identical so that either side of block 14/workpiece 10 may be exposed on fixture 48 to be machined, and either side of block 14 may be adjacent gate plate 30, and the gate openings 28 therein, for re-encapsulation. Wedge grooves 58 are provided on both the top and the bottom of center section 26B so as to permit the center section to be secured against bottom plate 24 in a manner to be described later when mounted in either potential orientation. A high temperature elastomer O-ring 60 may be provided on, for example, gate plate 30 to further facilitate sealing of the mold when clamping pressure is applied thereto. Thus, with the mold 26B, an encapsulated block 14, and the workpiece 10 encapsulated therein, may be encapsulated, machined and re-encapsulated while fully affixed in a frame 26, which in turn is precisely positionable on a fixture, thus permitting a standardized fixture to be utilized regardless of significant variations in the size, shape and final structure of the part being machined. The part is also fully supported, regardless of the amount of machining thereon.

FIGS. 7A and 7B illustrate a mold 22C suitable for use in a third embodiment of the invention where 2½D milling as shown in FIG. 2B is to be performed on workpiece 10. For this embodiment of the invention, machining is to be performed on no more than five sides of workpiece, no machining being performed on the bottom surface. Therefore, the bottom plate 24C for this embodiment of the invention has a plurality of studs or projections 60 which extend into the mold and which preferably are either threaded or have some other feature thereon which facilitates capture of the stud 60 in encapsulated block 14. Other potential structures for facilitating entrapment of the studs include one or more either flat or angled projections extending from each stud, which projections may be round bars, flat bars, rings or the like extending through or otherwise affixed to the stud and extending for a selected distance at a selected angle outward therefrom. Other entrapment configurations known in the art might also be utilized. Plate 24C also has a plurality of protruding heads 62, four such heads being shown for the embodiment of FIGS. 7A, 7B, which heads facilitate attachment of plate 24C to various commercially available fixturing systems.

Because the location of the block, and of the workpiece 10 encapsulated therein, are not transferred through the molded surfaces of block 14, but instead through the mounting features of plate 24C and of the heads 62, molding accuracies for this mold, as with the 2D mold, can be relaxed, thereby reducing manufacturing costs substantially. Further, because the mold walls do not need to be perfectly perpendicular to one another, a single piece mold can be used to perform the encapsulation, and a draft angle, for example 2°, can be provided on the walls 64 of the mold to facilitate removal of block 14 with plate 24C and to facilitate reinsertion of plate 24C with block 14 affixed thereto for re-encapsulation. Thus, as for the 2D mold shown in FIG. 6, plate 24C remains with block 14 through encapsulation, machining and re-encapsulation and is removed only when machining is completed and encapsulant is melted away to leave the finished part.

As for the embodiment shown earlier, and in particular the discussion with reference to FIG. 3, a chaffered recess is formed in gate plate 30 to facilitate proper positioning and centering of workpiece 10 in the encapsulant. However, because of the need to securely mount the encapsulated block to plate 24C, more encapsulant is provided under workpiece 10 than is provided around the sidewalls of the workpiece. The extra encapsulant under the workpiece can be provided since there is no need to machine through this encapsulant. The uncovered top of workpiece 10 can be covered during re-encapsulation as discussed earlier.

This embodiment also differs from earlier embodiment in that wedge grooves 41 are not formed in gate plate 30 and there are four wedge grooves 58' on section 26C, which are formed in a tope flange 65 thereof.

FIG. 7B also illustrates several other features of the invention. First, locating pins 66 are provided to assure proper alignment of the central mold structure 26C and gate plate 30. Second, a channel 68 is provided in center section structure 26C in which a thermocouple or other temperature-sensing device may be mounted in order to provide information on mold temperature.

Finally, while the gate openings 28 in FIG. 3 are shown as being of uniform size along their entire length, which size is preferably relatively small, on the order of 0.03 inches in diameter, this is not the most effective way to transfer heat to the gates 28 to maintain them in a liquid state, it being preferable that the openings be larger for this purpose so that encapsulant does not solidify therein. The advantages of small gates in permitting thin sprues which are easily broken when the encapsulant hardens and wider gates for improved heat transfer are provided by a two-part gate opening 28 having a short section 28A near the mold cavity of narrow diameter and a longer section 28B which flares to increasing diameter. Finally, sealing ring 70 is provided in gate plate 30.

While three specific mold configurations have been described above, these molds are by way of illustration only, and other molds which form a mold cavity from a center section or structure and two end plates, one of which is a gate plate, may also be utilized.

FIG. 8 illustrates a system 80 in which the molds 22A–22C, or other mold suitable for practicing the teachings of this invention, may be utilized in performing encapsulation and re-encapsulation operations. System 80 includes three basic components, namely a source 82 of melted encapsulation material, an injection mechanism 84 and a clamping mechanism 86. In FIG. 8, source 82 is shown as a melting storage tank 88. Tanks such as tank 88 are commercially available from a variety of sources including Ritehete Corporation, the specific model selected depending on the encapsulant being used, and thus on the temperature at which the tank must be maintained for the encapsulant to remain in a melted state, and the required capacity of the tank. For a representative tank, utilizing a bismuth/tin alloy composed of 58% bismuth and 42% tin, with a low melting point of 281° F., a 12-quart tank having a maximum temperature of 350° F. was found suitable. It was also found preferable that the tank, in addition to a main heater, also has a heated exit nozzle 90 permitting direct connection through line 91 to injector mechanism 84.

While the alloy mentioned above has many advantages as an encapsulation material, it is by no means ideal for all applications, and other encapsulation materials are also being investigated, including a 60/40-bismuth/tin alloy that possesses a melting range of 281° F. to 335° F. Many other encapsulation materials, including materials known in the art might also be usable depending on application.

Figure 9:
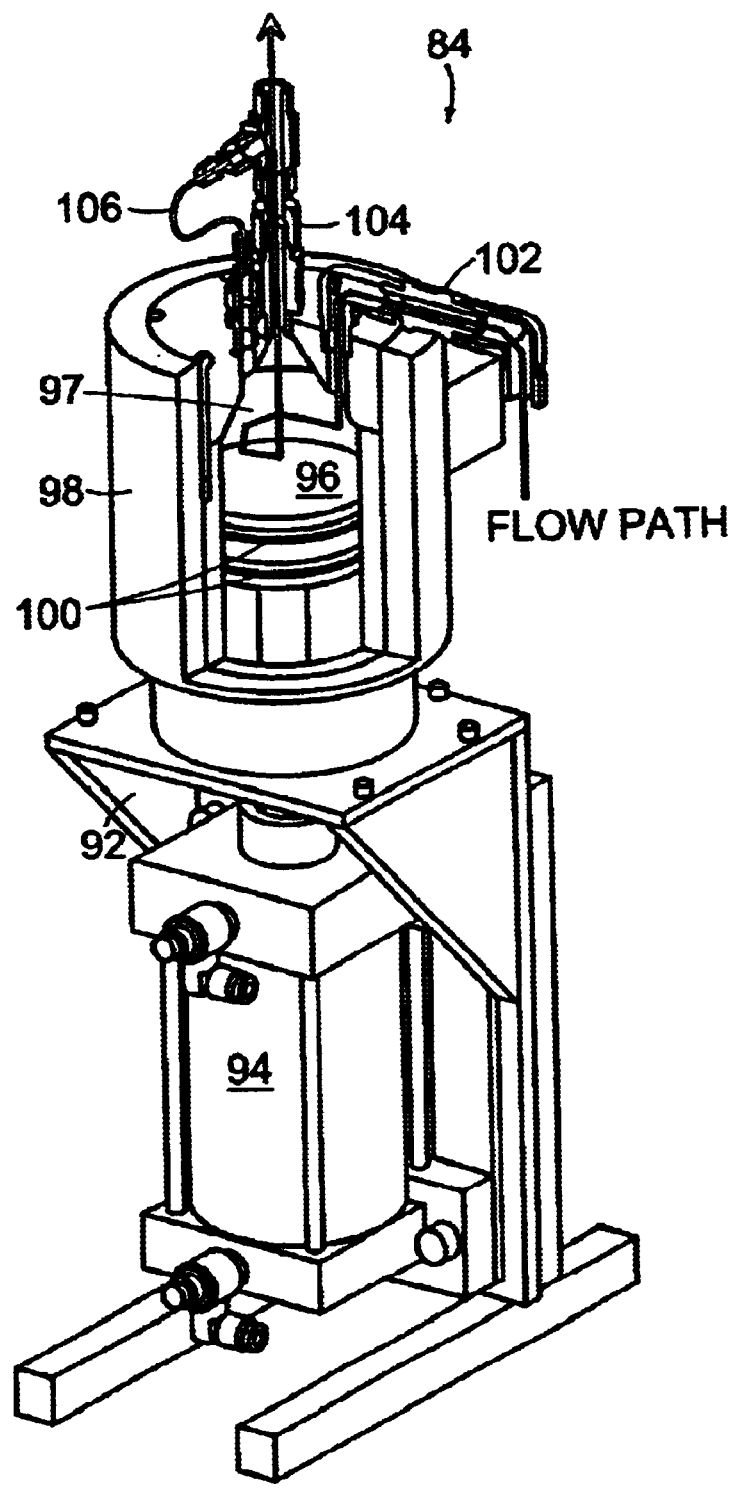
FIG. 9 is an enlarged, partially cutaway, perspective view of the injection mechanism portion of the system shown in FIG. 8.

FIG. 9 illustrates injector mechanism 84 in greater detail. This mechanism includes a pneumatic piston 94 mounted in the lower portion of a housing 92. Piston 94 operates to drive an injection cup 96 of a drive cylinder 97, the cylinder being surrounded by a ceramic heater 98 which maintains a temperature in the cylinder above the melting temperature of the encapsulant. Flow of encapsulant around cup 96 is prevented by a pair of high temperature elastomer O-rings 100. Melted encapsulant enters cylinder 97 through a first one-way check valve 102, being drawn into the cylinder when cup 96 is lowered by piston 94. When cup 96 is raised by the piston, melted encapsulant exits cylinder 97 through a second one-way check valve 104. Since there may be pressure buildup in the mold, in other portions of the clamping mechanism and/or in line 108 leading to the clamping mechanism, which may result in some spillage of encapsulant when the mold is opened, a small diameter bypass line 106 is provided around check valve 104 which allows just enough encapsulant to flow back into cylinder 97 when cup 96 is retracted to equalize the pressure in the mold, etc. to atmospheric, but not to create voids or a vacuum in the clamping mechanism or the lines leading thereto. Encapsulant leaving injector mechanism 84 through check valve 104 passes through line 108 (FIG. 8) to the clamping mechanism. Flexible lines 91, 106 and 108 are preferably wrapped along their entire length with a heater to keep encapsulant therein in a melted state and prevent clogging of these lines.

Figure 10A:
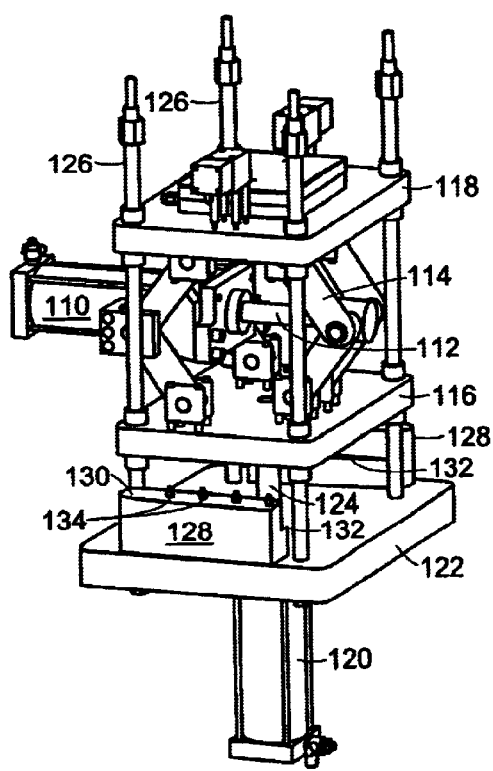
FIGS. 10A and 10B are a perspective view and a side view, respectively, of a portion of the clamping mechanism of FIG. 8 illustrating the two clamping stages.
Figure 10B:
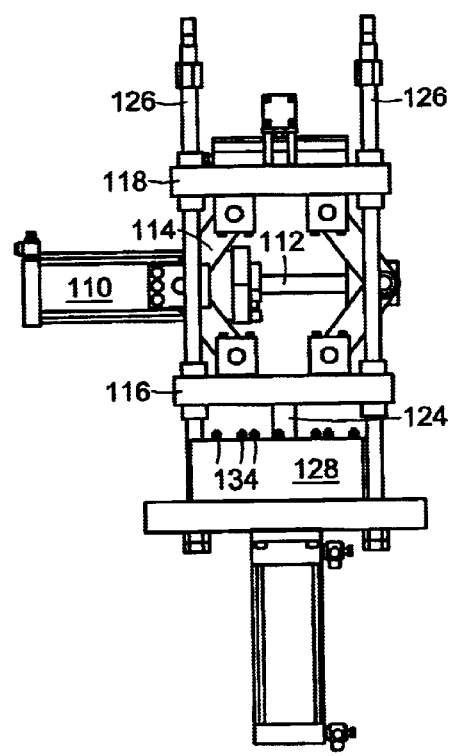

Clamping mechanism 86 has a lower drive portion for performing clamping and an upper portion adapted to receive the mold. The lower portion, as shown in more detail in FIGS. 10A and 10B, includes a first clamping stage which includes a first pneumatic piston 110, the extending arm 112 of which is connected to a mechanical linkage 114. The other side of the mechanical linkage is connected to the outer housing of piston 110. Mechanical linkage 114 controls the spacing between a plate 116, which is part of a secondary clamping stage and a bottom support, for example, bottom mold support plate 118. A secondary clamping stage, which is utilized to compensate for differences in the type and/or size of the mold being used in the clamping mechanism, and is required only if the clamping mechanism is being used to clamp molds of different type and/or size, consists of a pneumatic piston 120 securely mounted to a housing plate 122 of the clamping mechanism, and an arm 124 extending therefrom which is connected to plate 116 and moves this plate up or down depending on the type/size mold being clamped. Plates 116 and 118 move up and down on four parallel guide bars 126, which bars are secured at their lower end to a housing member, for example, housing plate 122.

A pair of locking blocks 128 are provided which are mounted to housing plate 122 and which, as shown in FIG. 8, are outside of plate 116 when this plate is in its lowermost position substantially resting on plate 122. This is the position of the secondary clamping mechanism for the largest mold which the clamping mechanism is adapted to handle. Each block 128 is pivotable about a corresponding pivot 130 to move at least a portion of the block under plate 116 when the plate is raised. For FIG. 10, it is assumed that the clamping mechanism is capable of handling three different sizes and/or types of mold, a step 132 being provided in each block 128 which is under plate 116 when the intermediate size mold is being utilized. When the smallest of the molds is being utilized, both blocks have been pivoted fully under plate 116. Fine adjustment screws 134 are provided on the top of each block which may be adjusted to compensate for slight variations in mold size or for variations in mold type. One way in which adjusting screws 134 might be utilized is to initially operate piston 120 to raise plate 116, and plate 118 which moves therewith, until mold closure at a selected very lower pressure is detected. Blocks 128 are then moved into place and screws 134 adjusted, to the extent necessary, so that the tops of the screws make contact with the underside of plate 116. Blocks 128 are required since the pressure applied by mechanically enhanced piston 116 is significantly higher than the pressure applied by piston 120 and, without blocks 128, a much heavier and more expensive piston 120 would be required in order to prevent plate 116 from moving downward under the pressure of the primary clamping stage and prevent the desired pressure from being applied to the mold.

Figure 12:
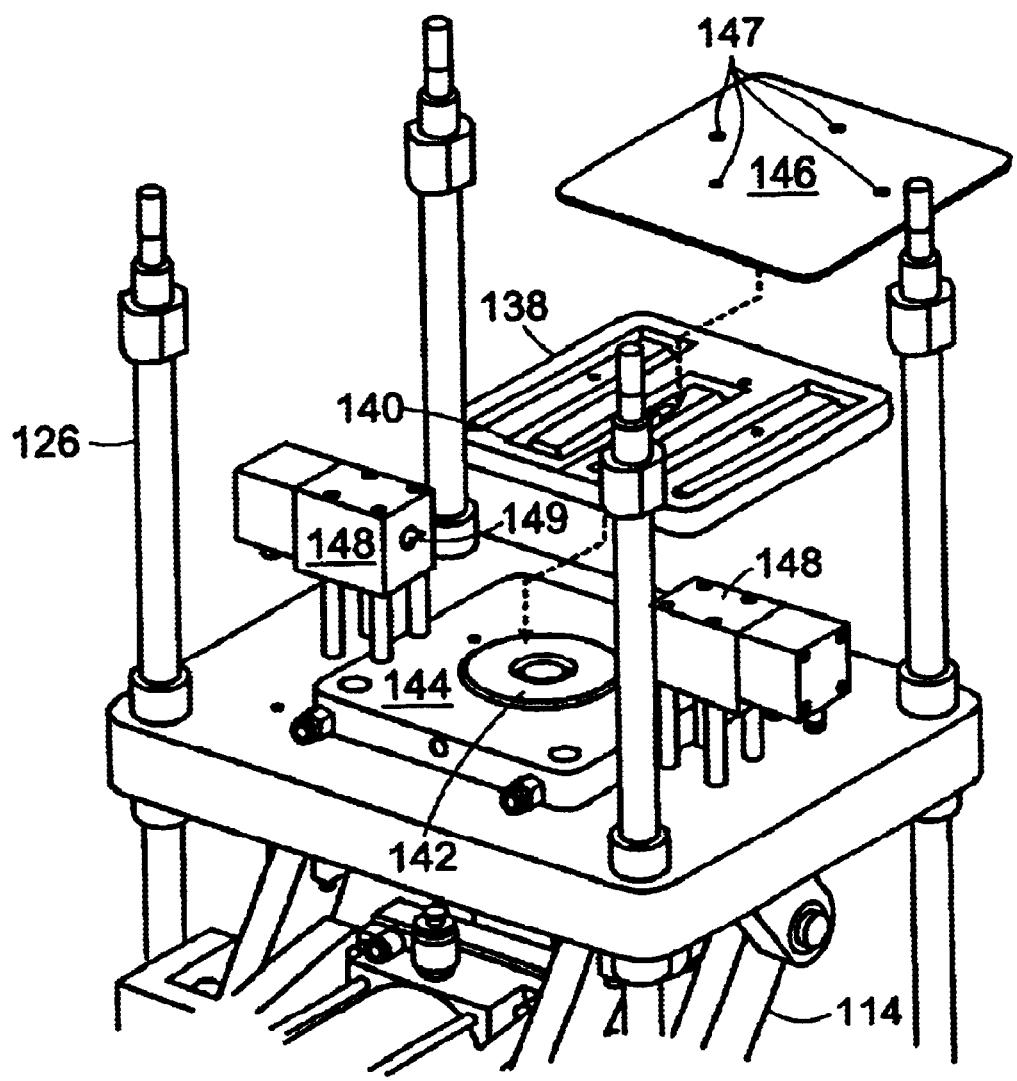
FIG. 12 is a partially exploded perspective view of a bottom support portion of the clamping mechanism.

Referring again to FIG. 8, a mold 22 (not shown) is positioned in the clamping mechanism between bottom support plate 118 and a top support plate, for example, top support plate 136. Since minimizing molding cycle time is extremely important, and the most significant factor in this cycle time is the heating and cooling of the molds, it is vital to isolate the mold from the rest of the heated zones of the clamp. This requires isolating the mold thermally from the rest of the clamping mechanism and is accomplished by placing insulation material above and below the mold and placing necessary heaters close to the mold areas. For a preferred embodiment mold gate plate 30 is of an insulating material, and additional insulation may also be provided above the gate plate. Thus, the gate plate should be of a material having poor heat transfer properties, but good mechanical properties at high temperature (i.e., able to withstand high temperatures). The currently preferred material for the gate plate is a high temperature ceramic. Further, as is shown in FIG. 12, a cooling plate 138 is located beneath the mold, this cooling plate having cooling channels 140 through which a suitable coolant may be flowed. For an illustrative embodiment, air is circulated through channels 140 at high velocity using the same pneumatic air supply as that used for the various pneumatic pistons as a pressure source. Another layer of insulation is placed beneath the mold heaters 142 in the form of an insulation plate 144. A cooling cover plate 146 is provided over cooling plate 138, this plate having holes 147 for pins extending therefrom which coact with corresponding holes in bottom plate 24. Thus, the mold is sandwiched between two layers of insulation so that it may be cooled to a temperature just below the melting point of the encapsulator once injection of encapsulator into the mold has been completed without disrupting the thermal state of the rest of the clamping mechanism.

Figure 11A:
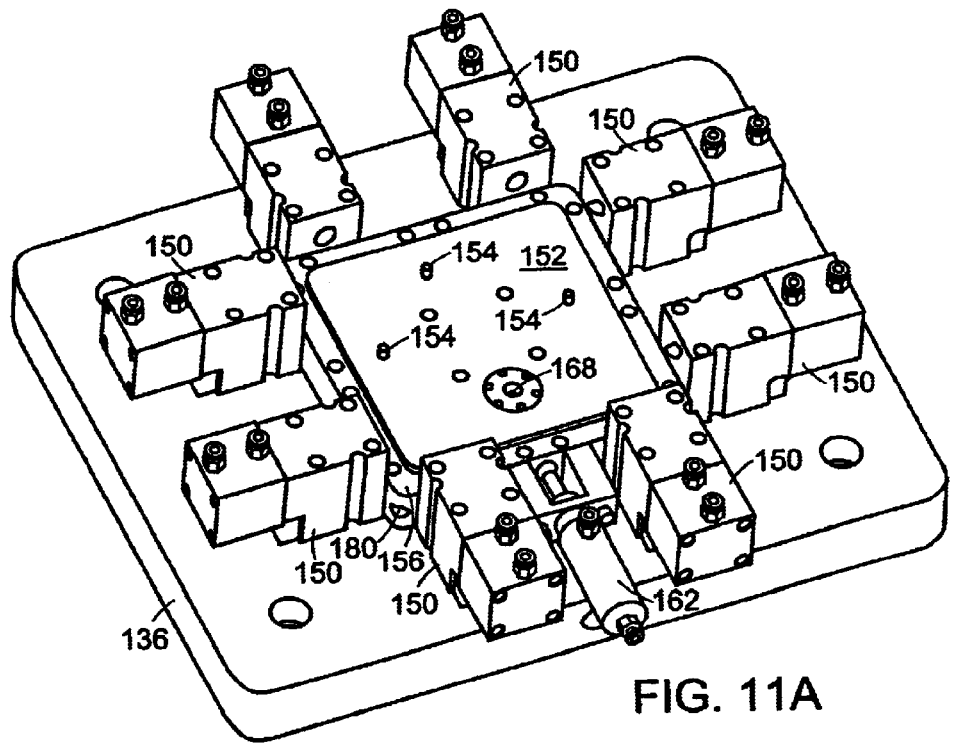
FIG. 11A is a perspective view of the underside of the head or top support, the support for the gate plate, for the clamping mechanism of FIG. 8.

The final elements shown in FIG. 12 are a pair of pneumatic piston wedge clamps 148 which co-act for example with wedge-shaped recesses 58 on the middle section or structure 26B of mold 22B to lock this section of the mold to the bottom plate of the mold in a manner to be discussed shortly. Each piston 148 has a wedge clamp shaft 149 extending therefrom. FIG. 11A is a bottom perspective view of top support plate 136 (turned upside down), the support plate to which top or gate plate 30 is mounted. Eight wedge clamp pistons 150 are provided on the plate which pistons, when activated, extend a wedge clamp shaft 151 thereof to engage the corresponding wedge grooves 41 (FIGS. 4 and 6) on top plate 30 to releasably secure gate plate to plate 136 and thus to clamping mechanism 86. Pneumatic pistons 148 and/or 150 may be operated in response to a manual input from a user when the user desires to remove a portion of the mold, for example to remove block 14 or to change the mold, or may be automatically operated under selected conditions. The quick release pneumatic pistons 148 and 150 positively secure the various components of the mold in the clamping assembly while permitting selected components of the mold or the entire mold to be quickly and easily removed and/or replaced when desired. As will be discussed later, slight variations in the position and/or use of the quick release pistons may be required for the different mold types. However, with such modifications, the single system 80 may be easily utilized with 2D, 2½D and 3D molds, which molds may be of different sizes, as well as with molds of two or more different sizes for each mold type.

Figure 11B:
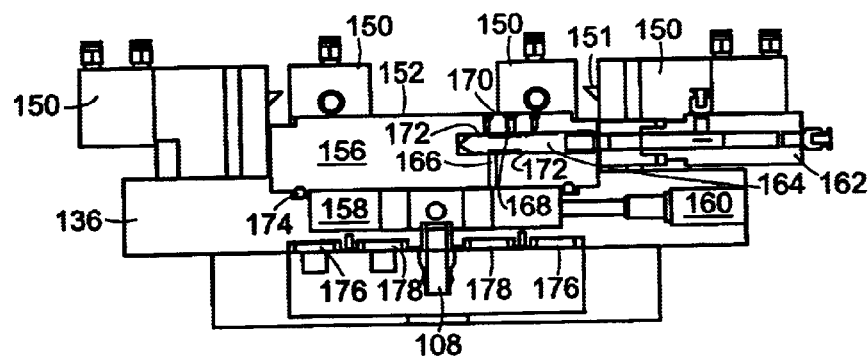
FIG. 11B is a cutaway side view of the mechanism shown in FIG. 11A.

Gate plate 30 is seated in area 152, locating pins 154 being provided in this area which co-act with corresponding holes on the top of gate plate 30 to assure proper and precise positioning of the gate plate. Area 152 is formed on a gate valve housing assembly 156 which overlies an encapsulation reservoir 158. Melted encapsulant on line 108 from injection mechanism 84 is applied to reservoir 158 formed in plate 136. Encapsulant pressure in reservoir 156 is monitored by a pressure transducer located in bore 160. A pneumatic piston controlled gate valve 162 is provided having a piston tip 164 which, when in the open position shown in FIG. 11B, permits encapsulant from reservoir 136 to flow through channel 166 and the circumferential groove in tip 164 to channel 168 leading to the gate plate. A diaphragm 170 of an elastomer material is positioned with a slit formed in the diaphragm in channel 168, the elasticity of the diaphragm being such that the slit is separated to permit melted encapsulant to flow therethrough to the gate plate when the encapsulant is under pressure, but the slit closes to cut off flow when this pressure is released. This physically disconnects the encapsulation material that has solidified within the mold from liquid encapsulant behind it, thus facilitating removal of gate plate 30 without having to break a sprue connection. The diaphragm may for example be of rubber and may close only when there is a near static flow condition, as occurs when the mold is completely full. Pneumatic valve 162 is closed by operating the pneumatic cylinder to move tip 164 to the right so that the circumferential groove is no longer between channels 166 and 168, thereby blocking the flow of melted encapsulant even if there is still pressure on the encapsulant from injector mechanism 84. O-rings 172 are provided on piston tip 164 to prevent flow around or into the groove formed therein when the valve is closed, and a sealing O-ring 174 is provided around reservoir 158.

Reservoir 136 is provided since, even with the heating of line 108, the length of this line can result in temperature variations in melted encapsulant reaching the clamping mechanism. Reservoir 136 assures a uniform and controlled temperature for the encapsulant being injected into the mold. A pair of ring heaters 176, 178 are provided above reservoir 158 and reservoir cap 152 is heated by four heaters 180, one at each corner thereof. Reservoir 158 is preferably large enough so as to contain enough melted encapsulant to fill the largest mold cavity with which the clamping mechanism is designed to operate, thus assuring that all encapsulant injected into a mold during a give shot is of substantially uniform and controlled temperature.

In operation, the heaters for tank 88 are initially turned on to melt solid pieces, blocks or slabs of encapsulation material inserted therein. While the encapsulant is melting, the gate plate 30 for the mold to be utilized is mounted in area 152, and pneumatic pistons 150 are operated to lock the gate plate therein 2½D mold 22C is mounted in a different way, having a thinner gate plate, but still thick enough to provide required insulating, so that center section 26C can be mounted adjacent thereto and pistons 150 engage grooves 58' to hold both the gate plate and center section 26C to top support 13C. The bottom plate of the mold is also inserted on plate 146, and center section 26 of the mold is properly positioned on top thereof. Pneumatic pistons 148 are then operated under manual control to lock center section 26 in place, which also functions to lock bottom plate 24 in place. Again, only the bottom plate is clamped for the 2½D mold. Locating pins 154 and 147 co-acting with corresponding holes on the gate plate and bottom plate, respectively, of the mold to assure, in conjunction with the pistons, against any horizontal movement of the top and bottom plate once they are positioned, as well as assuring proper positioning thereof. At an appropriate point in the assembly of the mold, depending on the type of mold, a workpiece 10 is inserted in the mold cavity via one of the mold components. When the mold and workpiece are in place, piston 120 is activated to move plate 116, and plate 118 which moves therewith, to the proper position for the mold being utilized, and blocks 128 are moved into place and adjusted as necessary for the mold being utilized. These operations may be performed while encapsulant is melting in tank 88 or at any time thereafter. Once encapsulant is melted in tank 88, which depending on a variety of parameters may take one hour to several hours, heaters 90, 98, 142, 176, 178, 180 and other heaters in the system, including those on the various lines, may be turned on, and piston 110 may be operated to apply the desired clamping pressure to the mold. At this point, the system is ready to begin an encapsulation operation.

Piston 94 is then retracted to bring a quantity of encapsulant at least sufficient to fully fill the mold cavity being utilized into cylinder 97, and piston 94 then pushes cup 96 forward to force melted encapsulant through check valve 104 and line 106 and through line 108 into reservoir 158. At the same time that piston 94 is being operated to inject melted encapsulant from injected mechanism 84 to clamping mechanism 86, gate valve piston 162 is operated to open the gate valve. The first shot from the injector mechanism might be to fill reservoir 158, valve 162 preferably being closed during this operation. Once the reservoir is full, valve 162 may be opened, permitting encapsulant when pressure is applied to the reservoir to flow under pressure through channel 166, around valve tip 164, through channel 168 and the slit in diaphragm 170 to gate plate 30, and through gates 28 of this plate into the mold cavity. Encapsulant will continue to flow into the cavity, causing workpiece 10 located therein to rise to the position shown in FIG. 3B, until the cavity is full. Filling of the mold normally takes about ½ second for the illustrative embodiment.

When the mold is full, pressure on both sides of slit diaphragm 170 equalizes, preventing further flow through the diaphragm and permitting the slit therein to close. Closing of the diaphragm creates a break in the molten encapsulant at that point. When this occurs, and once workpiece 10 has floated to the desired position shown in FIG. 3B, heater 142 around the mold may be turned off, and coolant may be applied to channels 140 to quickly cool the mold. This results in the encapsulant solidifying therein into an encapsulated block 14. Cooling is done from the bottom up to solidify the gates last, allowing packing of encapsulant throughout the solidification process. Pneumatic pressure then may be removed from piston 110, releasing pressure on the mold and permitting the mold to open. For a 3D mold as shown in FIG. 5, it may be necessary to remove the entire mold to release the block since the block may remain attached to the gate plate after separation due to sprues. For the 2D mold, the top and bottom plates of the mold are separated sufficiently so that, when pistons 148 are released, the center section 26B of the mold having block 14 embedded therein may be slid out. At least the center section 26C and bottom plate 24C may be removed for the 2½D mold unless the stroke of a first clamping stage, and if necessary the second clamping stage, is sufficient to fully remove the block from section 26C. For the 2D case, the block embedded in center section ring 26B may be mounted to fixture plate 48 (FIG. 6B) for machining of the workpiece, while in the 2½D case, the bottom plate with block 14 affixed thereto, is separated from center section 26C and the bottom plate attached to an appropriate fixture for machining of the workpiece. When machining on a given side of the workpiece has been completed, the block 14 may be reinserted in the mold of FIGS. 4 and 5 for the 3D embodiment; the center section 26B may be reinserted between the top and bottom plates with either side of the block 14 to be machined facing the gate plate, the side which was just machined being the side which should be facing the gate plate in this case; or the block 14 may be reinserted in center section 26C of the mold for the 2½D embodiment (FIG. 7), bottom plate 24C being attached to the block when this occurs. When this occurs, piston 110 is again activated to clamp the mold, and piston 94 is again activated to bring additional encapsulant into cylinder 96 and to inject such encapsulant to apply pressurized encapsulant through reservoir 58 into the cavity in the manner previously discussed to refill openings formed in the block by the machining process and to restore block 14 to its initial shape (and to add encapsulant on its top for some embodiment as previously discussed). Once the re-encapsulation has been completed, either the block 14 alone or the block and frame 26B or bottom plate 24C to which it is affixed are removed in the manner discussed above for further machining on workpiece 10. This process of machining and re-encapsulation is repeated as many times are required for all necessary machining to be completed on workpiece 10.

While it is possible for system 80 to be utilized with one workpiece at a time until all machining on the workpiece has been completed, the time required for encapsulation and for re-encapsulation is normally significantly less than the time required for performing machining on one side of a workpiece. Therefore, it should be possible to use a single system 80 with perhaps three systems performing various machining operations, or maybe more. While it would be preferable if substantially the same mold were being used at a given time for all machines so that the gate plate would not need to be replaced between operations and the secondary clamping stage of cylinder 120 and blocks 128 would not need to be adjusted between operations, and, while this is clearly a more efficient way to operate, this is not a limitation on the invention, particularly if the adjustments of the secondary clamping stage can be automated. Where the mold used is to be changed, both pistons 148 and 150 would be retracted, the gate plate for the new mold inserted and locked into place by pistons 150, the remainder of the mold inserted and locked into place, and the secondary clamping stage operated to properly adjust the clamp for the new mold.

While the system 80 shown in FIG. 8 and described above is preferable for a number of reasons, including its flexibility in handling various mold types and mold sizes, and the fact that it can deliver more than 20,000 pounds of clamping force for an illustrative embodiment, this system is also relatively large and heavy and is therefore adapted only for use at a facility where it will not be subjected to frequent moving. FIGS. 13 and 14 show a far simpler and less flexible system which will normally handle only a single smaller mold size and which is adapted for delivering only about 2,000 pounds of clamping force for an illustrative embodiment, but which system is significantly smaller and lighter than the system 80 of FIG. 8, and which system is therefore portable.

Referring to FIGS. 13 and 14, a melting tank 88' having a heater 180 therearound is connected through a one-way check valve 102 to an injection cylinder 97 operated by a pneumatic piston 98'. Melted encapsulant is passed through a line 108' and head 136' of a clamping mechanism to and through gate plate 30 and into the mold cavity. For illustration purposes, a 2½D mold 22C is shown as mounted in the clamping mechanism, four clamps 150 being provided which coact with wedge grooves 58' on flange 65 of mold center section 26C to secure both section 26C and the gate plate 30 above it to head 136'. The bottom plate 24C, with the workpiece resting thereon, is mounted to movable cylinder 182 of clamping pneumatic piston 110', there being only one clamping stage for this embodiment since it is adapted to handle only small molds. Mechanical enhancement is not required since the extra pressure is not required for the small mold. Once all of the elements of the mold and the workpiece are in place, pneumatic piston 110' is operated to close and seal the mold. Pneumatic piston 98' may then be operated to inject encapsulant into the mold. Since there is no check valve between the mold and cylinder 97, pressure is equalized for this embodiment of the invention without bypass line 106. However, the absence of a check valve 104 and bypass line 106 has been found to complicate injection procedures in that the cylinder 97 must be retracted fully before the mold is opened to prevent sucking of encapsulant from the mold when the piston is opened and putting air in the mold. Because small sizes of molds are used and hosing is short in the system 80', reservoir 158 can be dispensed with and melted encapsulant can be applied directly from cylinder 97 to the mold. Gate valve 162, 164 is also eliminated for this embodiment of the invention, and split diaphragm, 170 may or not be employed. Again, performance is enhanced if these elements are included and, depending on the requirements of a particular application, these elements may be added, even for a portable version. For this embodiment, once the mold has been cooled, active cooling not being required for the small molds used, cylinder 182 may merely be retracted by piston 110' to both open the mold and remove both bottom plate 24C and block 14 embedded thereto, plate 24C then being removed from the cylinder 182 and mounted to a fixture in the manner previously described for machining of the workpiece. The above process is reversed to reseal the mold for re-encapsulation. This process may be repeated as often as necessary to complete machining of up to five sides of the workpiece. With suitable modification of a general type discussed in connection with system 80, system 80' may be used with a 3D mold 22A or a 2D mold 22B of a small size.

While the control for the various operations described above may be performed manually, it is preferred that at least most of the operations, including operations of pneumatic pistons, heaters, etc., be automatically controlled by a suitable programmed general purpose processor, special purpose processor or hybrid processor. In particular, while a separate processor may be utilized to control the encapsulation system 80, it is more likely that a single processor would be used for controlling the entire machining operation, including, in addition to encapsulation, fixturing of the encapsulated block at the appropriate machine, machining operations performed by a machine and the return of the machined encapsulated block to the encapsulator for reencapsulation. The use of encapsulation significantly simplifies all of the decisions involved in fixturing so that little intelligence is needed to control the apparatus or plan for the fixturing. The various processes are thus more easily automated, and any computer control system can be interfaced by one skilled in the art to control the entire encapsulation/fixturing operation.

Various molds have thus been provided for facilitating the encapsulation and re-encapsulation of workpieces for universal fixturing, several different types of molds adapted for 3D, 2½D, and 2D machining being presented. Various systems have also been described for clamping such molds and for injecting melted encapsulant therein under pressure to effect encapsulation and re-encapsulation of a workpiece in the molds. However, while various embodiments of molds, encapsulation systems, and various components of such systems, have been described in detail above, and variations on such embodiments have also been presented, it is to be understood that such description is for purposes of illustration only, and that numerous additional modifications in such molds, systems and components may be made while still practicing in the invention. Thus, while the invention has been particularly shown and described above with reference to preferred embodiments, the foregoing and other changes in form and detail may be made therein by one skilled in the art while still remaining within the spirit and scope of the invention, which is to be defined only by the appended claims.

What is claimed is:

1. A system for encapsulating and re-encapsulating a workpiece to be machined in an encapsulant to form an encapsulated block including:
 a source of melted encapsulant;
 a clamping mechanism for a mold having an encapsulation cavity, side walls of which are defined by a structure, and including a top plate and a bottom plate, which plates mate with said structure on opposite sides thereof to fully define and to seal said cavity, one of said plates being a gate plate having a plurality of openings through which encapsulant is applied to the cavity, said clamping mechanism when actuated, holding the structure and plates of said mold together under a selected pressure; and an injector mechanism which moves melted encapsulant under pressure from said source through said gate plate to said cavity, wherein said clamping mechanism includes a top support to which said top plate is mounted, a bottom support to which said bottom plate is mounted, said structure being mounted between the top and bottom plates, and a primary clamping stage mounted to move at least one of said supports toward the other when activated to seal said mold under pressure.

2. A system as claimed in claim 1 wherein said primary clamping stage includes a pneumatic piston and a mechanical enhancement for substantially increasing the force applied by said piston to said mold.

3. A system as claimed in claim 1 where said clamping mechanism is adapted to clamp molds of different sizes, and including a secondary clamping stage for adjusting the position of at least one of said supports when said primary clamping stage is in its deactivated position to accommodate the size of mold being used.

4. A system as claimed in claim 3 including at least one locking block mounted between said bottom support and a housing member of said clamping mechanism for at least some of said mold sizes, the height of block between the support and housing member varying with the size of the mold.

5. A system as claimed in claim 4 wherein each of said locking blocks includes a fine adjustment mechanism operable to compensate for small variations in mold size.

6. A system for encapsulating and re-encapsulating a workpiece to be machined in an encapsulant to form an encapsulated block including:

a source of melted encapsulant;

a clamping mechanism for a mold having an encapsulation cavity, side walls of which are defined by a structure, and including a top plate and a bottom plate, which plates mate with said structure on opposite sides thereof to fully define and to seal said cavity, one of said plates being a gate plate having a plurality of openings through which encapsulant is applied to the cavity, said clamping mechanism when actuated, holding the structure and plates of said mold together under a selected pressure;

an injector mechanism which moves melted encapsulant under pressure from said source through said gate plate to said cavity; and a component positioned adjacent said gate plate and through which encapsulant flows before reaching said gate plate, which component permits flow of encapsulant therethrough when the encapsulant is under pressure from said injector mechanism and which breaks the flow of encapsulant when said pressure is removed.

7. A system as claimed in claim 6 wherein said component is an elastomer diaphragm having a split formed therein.

8. A system for encapsulating and re-encapsulating a workpiece to be machined in an encapsulant to form an encapsulated block including:

a source of melted encapsulant;

a clamping mechanism for a mold having an encapsulation cavity, side walls of which are defined by a structure, and including a top plate and a bottom plate, which plates mate with said structure on opposite sides thereof to fully define and to seal said cavity, one of said plates being a gate plate having a plurality of openings through which encapsulant is applied to the cavity, said clamping mechanism when actuated, holding the structure and plates of said mold together under a selected pressure;

an injector mechanism which moves melted encapsulant under pressure from said source through said gate plate to said cavity; and quick release elements for releasably securing at least one of said mold structure, top plate and bottom plate in said clamping mechanism, the quick release elements facilitating insertion and removal of mold components.

9. A system as claimed in claim 8 wherein said top plate is the gate plate, and wherein said elements include a first set of elements releasably securing said top plate to a top structure of said clamping mechanism.

10. A system as claimed in claim 9 wherein said quick release elements include a second set of elements for releasably securing said structure to said bottom plate, said bottom plate being mounted to a bottom structure of the clamping mechanism.

11. A system as claimed in claim 8 wherein each quick release element includes a piston-driven wedge shaft co-acting with a corresponding wedge-shaped recess formed in the mold structure/plate being clamped.

12. A clamping mechanism for holding together under a selected pressure a center structure, a top plate and a bottom plate which define a mold cavity of a mold used to encapsulate and to re-encapsulate a workpiece in a selected encapsulant, the mechanism including:

a top support to which said top plate is mounted, a bottom support to which said bottom plate is mounted, said center structure being mounted between the top and bottom plates, and a primary clamping stage mounted to move at least one of said supports toward the other when activated to seal said mold under pressure.

13. A clamping mechanism as claimed in claim 12 wherein said primary clamping stage includes a pneumatic piston and a mechanical enhancements for substantially increasing the pressure applied by said piston to said mold.

14. A clamping mechanism as claimed in claim 12 where said clamping mechanism is adapted to clamp molds of different sizes, and including a secondary clamping stage for adjusting the position of at least one of said supports when said primary clamping stage is in its deactivated position to compensate for the size of mold being used.

15. A clamping mechanism as claimed in claim 14 including at least one locking block mounted between said bottom support and a housing member of said clamping mechanism for at least some of said mold sizes, the height of block between the support and housing member varying with the size of the mold.

16. A clamping mechanism as claimed in claim 15 wherein each of said locking blocks includes a fine adjustment mechanism operable to compensate for small variations in mold size.

17. A clamping mechanism as claimed in claim 12 including components which thermally isolating said mold from said clamping mechanism.

18. A clamping mechanism as claimed in claim 17 wherein at least one of said top plate and bottom plate is a gate plate through which encapsulant is applied to the mold cavity, said gate plate being of a material having poor thermal conductivity.

19. A clamping mechanism as claimed in claim 17 including a cooling plate and insulation between the bottom plate of said mold and said bottom support, said cooling plate, when activated, facilitating cooling of said mold.

20. A clamping mechanism as claimed in claim 12 including a valve positioned to selectively cut off flow of encapsulant to said gate plate even when pressure is being applied by said injector mechanism.

21. A clamping mechanism as claimed in claim 12 including a component positioned adjacent said gate plate and through which encapsulant flows before reaching said gate plate, which component permits flow of encapsulant therethrough when the encapsulant is under pressure from said injector mechanism and which breaks the flow of encapsulant when said pressure is removed.

22. A clamping mechanism as claimed in claim 21 wherein said component is a diaphragm having a split formed therein.

23. A clamping mechanism as claimed in claim 12 including quick release elements for releasably securing at least one of said mold structure, top plate and bottom plate in said clamping mechanism, the quick release elements facilitating insertion and removal of mold components.

24. A clamping mechanism as claimed in claim 23 wherein said top plate is the gate plate, and wherein said elements include a first set of elements releasably securing said top plate to a top structure of said clamping mechanism.

25. A clamping mechanism as claimed in claim 24 wherein said elements include a second set of elements for releasably securing said structure to said bottom plate, said bottom plate being mounted to a bottom structure of the clamping mechanism.

26. A clamping mechanism as claimed in claim 23 wherein each quick release element includes a piston driven wedge shaft co-acting with a corresponding wedge-shaped recess formed in the mold structure/plate being clamped.

* * * * *

UNITED STATES PATENT AND TRADEMARK OFFICE
CERTIFICATE OF CORRECTION

PATENT NO.    : 6,688,871 B1
DATED         : February 10, 2004
INVENTOR(S)   : Elmer C. Lee et al.

It is certified that error appears in the above-identified patent and that said Letters Patent is hereby corrected as shown below:

<u>Title page,</u>
Item [75], Inventors, should read:

-- [75] Inventors: Elmer C. Lee, Cambridge, MA (US)
              Sanjay E. Sarma, Belmont, MA (US) --

<u>Column 7,</u>
Line 3, please replace "standardize" with -- standardized --.
Line 31, please replace "arc" with -- are --.

<u>Column 17,</u>
Line 18, please replace "comer" with -- corner --.

Signed and Sealed this

Twenty-second Day of June, 2004

JON W. DUDAS
*Acting Director of the United States Patent and Trademark Office*